UNITED STATES PATENT OFFICE.

MEDA VAY HULL, OF CHICAGO, ILLINOIS, ASSIGNOR TO LA MEDA MFG. COMPANY, OF CHICAGO, ILLINOIS, A CORPORATION OF ILLINOIS.

COSMETIC.

1,332,190.     Specification of Letters Patent.     Patented Feb. 24, 1920.

No Drawing.     Application filed June 21, 1918. Serial No. 241,127.

*To all whom it may concern:*

Be it known that I, MEDA VAY HULL, a citizen of the United States, and a resident of the city of Chicago, in the county of Cook and State of Illinois, have invented certain new and useful Improvements in Cosmetics; and I do hereby declare that the following is a full, clear, and exact description of the same.

My invention has reference more particularly to a toilet preparation or composition and the process of making same, wherein the characteristic properties of a face powder and a face cream are combined so that the skin is softened by the cream constituents of the composition, and the powder is caused to adhere to the skin in a more permanent manner than if used separately.

For the purpose of giving the skin a soft and pleasing appearance, it is customary to use what is commonly known as face powder, which is applied to the skin in a dry condition and rubbed thereon so that more or less thereof adheres to and remains on the skin. However, as it is applied in a dry condition it does not readily adhere and rubs off easily and becomes streaked or entirely effaced if exposed to perspiration or moisture, and therefore is not satisfactory for warm weather, dancing, swimming and other sports.

Another preparation which is also quite commonly used is known as cold cream, which is provided in paste form adapted to be rubbed on the skin, and has the property of moistening and softening the skin and maintaining the skin in such condition for a period of time, such cream being variously compounded according to the benefits desired to be obtained by the particular manufacturer.

Both the face powder and cold cream preparation have desirable characteristics peculiar to themselves, the principal purpose and effect of face powder being to improve the appearance of the skin and remove gloss, and of the cold cream to soften and lubricate or improve the condition of and protect the skin.

It is an object therefore of my invention to provide a composition or cosmetic preparation having the combined properties of a cold cream and face powder.

A further object of my invention is to provide a composition consisting of a cold cream and face powder suitably combined in a paste form and having the properties of softening and lubricating the skin and providing and leaving a film of face powder adhering to the skin in a more permanent manner than when the face powder is applied separately, the combination, when applied, affording a more efficient protection for the skin from sun burns, tanning, wind burns, freckles and chapping than either used separately.

Another object of my invention is to provide a composition consisting of a combination of face powder and an ingredient composed in small part of a waxy material whereby the face powder is caused to adhere to the skin without clogging the pores and is not affected by perspiration and water.

Another object of my invention is to provide a composition comprising a face powder and ingredients suitable to cause the powder to adhere to the skin more permanently than when used alone and without clogging the pores.

Another object of my invention is to provide a cosmetic preparation comprising a combined face powder and cold cream composition properly prepared to combine the characteristics of a face powder and a cold cream and whereby the skin is softened and lubricated and protected and a quantity of face powder applied so that the face powder so applied adheres in a more permanent manner without drying the skin, and with other beneficial results.

In my invention I provide a composition containing a face powder and a cold cream and thereby combine the characteristics of each in a single preparation, the latter of which is particularly constituted to cause the powder to adhere to the skin so as to be unaffected by moisture or water or other causes which easily disturb or efface the powder from the skin if it is applied alone.

In practising my invention I preferably prepare the cold cream and powder separately in their complete form, and I prefer to use a cold cream having wax or similar acting ingredient which acts as a waterproof binder to hold the powder on the skin, and I prefer to mix the cold cream and powder in proportions, by weight, of substantially four parts of cream to five parts of powder, and thoroughly incorporate the face powder in the cream by whipping, milling or otherwise mixing to insure a thorough and uniform incorporation of the powder in the cream.

The preparation of the cream and powder and the combination thereof which I have found to give the best results and which I prefer to use consists in making the cream substantially according to the following formula:

8 pounds of mineral oil, (cream oil).
1 pound white bees wax.
2 pounds ceresin wax.
4 pounds borated water.

One half of the mineral or cream oil is placed in a container with the wax and the wax dissolved in this mineral oil. When the wax is all dissolved, add the balance of the oil, and then the borated water and stir until you have a fine white mass. The borated water is made by adding four ounces of borax to one gallon of boiling water. The mixture may also be perfumed to give the resultant composition the desired scent, and is also usually tinted in the final compounding.

The face powder I prefer to use is made by mixing together powdered talc, precipitated chalk, and zinc oxid, which are measured by weight so as to give substantially the following proportions: powdered talc 77 parts; precipitated chalk 6 parts; and zinc oxid 17 parts.

Quantities of the resultant cream and face powder in the proportion by weight (four parts cream and five parts powder) are then taken and the powder is thoroughly incorporated into the cold cream by beating or whipping or by milling, it being necessary in order to obtain the best results, to have the powder thoroughly and uniformly incorporated with the cold cream. A small quantity of coloring matter may also be added to the finished composition to give it different shades to suit different complexions, for instance, white, flesh, or brunette, as is customary with face powders.

The formula which I have indicated above provides a composition which is harmless, non-poisonous and antiseptic. It will not clog the pores of the skin and its action on the skin is protective and beneficial and, when so compounded, is in a convenient form to be applied without spilling and waste as in the use of the ordinary face powders, and when rubbed on the skin, results in softening and lubricating the skin and leaves a thin film of the face powder, which, by reason of the constituency of the cream element, adheres firmly bound to the skin and is not affected by moisture and other causes which impair the usefulness of the ordinary face powders.

While I have described my invention as prepared according to certain preferred formulæ, and by combining the ingredients in a certain preferred manner, it is, of course, to be understood that said formulæ and directions for preparation are only illustrative and the ingredients and order and method of compounding will, of necessity, vary to a considerable degree, dependent on the consistency of the product desired. I therefore do not purpose limiting the patent granted hereon otherwise than necessitated by the prior art.

I claim as my invention:

1. A cosmetic paste compound consisting of approximately five ninths, by weight, of face powder and approximately four ninths, by weight, of cold cream.

2. A cosmetic preparation comprising a composition of powdered talc, precipitated chalk, and zinc oxid, and a composition consisting of mineral oil, bees wax, ceresin wax, and borated water, said compositions being compounded in proportions substantially equivalent to four parts cream and five parts powder measured by weight.

3. A cosmetic preparation comprising a face powder consisting of 77 per cent. powdered talc, 6 per cent. precipitated chalk, 17 per cent. zinc oxid, compounded with a face cream composition consisting of mineral oil, white bees wax, ceresin wax, and borated water, combined in the proportion of 8 pounds of mineral oil, 1 pound of white bees wax, 2 pounds ceresin wax and 4 pounds borated water, the said facial cream and facial powder being compounded in proportions substantially of or equivalent to 4 pounds of facial cream to 5 pounds of facial powder.

4. The process of preparing a cosmetic which consists in combining and mixing ingredients to form a face powder, and in combining and mixing ingredients to form a face cream, and then compounding the completed face powder with the completed cold cream in suitable proportions so that when the combined compound is rubbed on the skin, the predominant discernible element thereof is the face powder.

5. The process of preparing a cosmetic which consists in compounding a face powder comprising powdered talc, precipitated chalk and zinc oxid, with a cold cream comprising mineral oil, wax and borated water in suitable proportions so that when the combined compound is rubbed on the skin, the predominant discernible element thereof is the face powder.

6. The composition of matter comprising a face powder, an oil, and a waxy material suitably combined and compounded so that when rubbed on the skin the oil is absorbed and vanishes and leaves a covering of face powder affixed to the skin by means of the waxy material.

7. A cosmetic paste compound consisting of approximately four parts by weight of a vanishing cold cream composition including a water and perspiration proof binder, and approximately five parts by weight of face powder composition, the elements of said paste, excepting the face powder, being adapted to vanish when rubbed on the skin and leave a coating of face powder affixed thereon by means of said binder.

In testimony whereof I have hereunto subscribed my name in the presence of two subscribing witnesses.

MEDA VAY HULL.

Witnesses:
 FRANK A. BREMER, Jr.,
 LAWRENCE REIBSTEIN.